US012240240B2

(12) United States Patent
Konishi et al.

(10) Patent No.: US 12,240,240 B2
(45) Date of Patent: Mar. 4, 2025

(54) LIQUID EJECTION HEAD

(71) Applicant: RISO Technologies Corporation, Tokyo (JP)

(72) Inventors: Tsubasa Konishi, Sunto Shizuoka (JP); Akimasa Toyama, Yokohama Kanagawa (JP)

(73) Assignee: RISO Technologies Corporation, Tokyo (JP)

( * ) Notice: Subject to any disclaimer, the term of this patent is extended or adjusted under 35 U.S.C. 154(b) by 211 days.

(21) Appl. No.: 17/835,922

(22) Filed: Jun. 8, 2022

(65) Prior Publication Data

US 2023/0182467 A1 Jun. 15, 2023

(30) Foreign Application Priority Data

Dec. 15, 2021 (JP) ................................ 2021-203038

(51) Int. Cl.
*B41J 2/14* (2006.01)

(52) U.S. Cl.
CPC ....... *B41J 2/14201* (2013.01); *B41J 2/14209* (2013.01); *B41J 2002/14491* (2013.01)

(58) Field of Classification Search
CPC ................ B41J 2/14201; B41J 2/14209; B41J 2002/14491
See application file for complete search history.

(56) References Cited

U.S. PATENT DOCUMENTS 8,613,499 B2 12/2013 Miyazawa
2018/0086072 A1* 3/2018 Tozuka ................. B41J 2/1634
2018/0147845 A1 5/2018 Iijima

FOREIGN PATENT DOCUMENTS

JP 2002113861 A 4/2002
JP 2003039661 A 2/2003
JP 2012061768 A 3/2012

OTHER PUBLICATIONS

Extended European Search Report mailed May 3, 2023 in corresponding European Patent Application No. 22186087.7, 8 pages.

* cited by examiner

*Primary Examiner* — Geoffrey S Mruk
(74) *Attorney, Agent, or Firm* — Kim & Stewart LLP

(57) ABSTRACT

A liquid ejection head includes a plate including a nozzle for ejecting a liquid, a substrate, an actuator including a pressure chamber. The actuator includes an upper surface and a side surface connecting the upper surface to the substrate. The side surface is at an angle θ between 45 and 90 degrees. The head includes an electrode connected to the chamber. The electrode includes a first wiring on the side surface and a second wiring on the substrate within a first region thereof. The first region has a length A from a position of a line along which the upper and side surfaces meet, and the value of length A is B/tan θ', where B is a distance between the upper surface and the substrate and θ' is (θ−45)×2.

20 Claims, 9 Drawing Sheets

LIQUID EJECTION HEAD

CROSS-REFERENCE TO RELATED APPLICATION

This application is based upon and claims the benefit of priority from Japanese Patent Application No. 2021-203038, filed Dec. 15, 2021, the entire contents of which are incorporated herein by reference.

FIELD

Embodiments described herein relate generally to a liquid ejection head and an image forming apparatus including an ink ejection head.

BACKGROUND

In recent years, in liquid ejection heads such as an ink jet head for printers, higher productivity (e.g., throughput) and an increase in the amount of droplets have been required. At the same time, a head size is desirably miniaturized, and thus achieving both higher productivity and miniaturization have been needed.

Conventional liquid ejection heads have a configuration in which a plurality of partition walls are formed at predetermined intervals and actuators formed of piezoelectric materials with ink flow paths between the partition walls are provided on a substrate made of ceramic, and an end surface of the partition wall is an inclined surface that extends outward from the top to the bottom of the end surface.

In such a liquid ejection head, the gentler the inclination of the inclined surface of the actuator, the larger the size in the lateral direction of the substrate that is required. Therefore, by increasing the angle (steepness) of the inclined surface, the required size in the lateral direction can be reduced. However, if the angle between a wiring surface on the substrate and the inclined surface of the actuator is too large, for example, 45 degrees or more, then when an electrode pattern is formed on the inclined surface and/or the wiring surface by photolithography, the electrode pattern formed on the substrate near the inclined surface may be irradiated with light reflected off the inclined surface and the intended wiring pattern formed by the photolithography becomes distorted or otherwise flawed, which makes wiring formation difficult.

DETAILED DESCRIPTION

In general, according to one embodiment, a liquid ejection head includes a nozzle plate including a nozzle from which a liquid can be ejected, a substrate facing the nozzle plate, and an actuator disposed on the substrate>. The actuator includes a pressure chamber that connects to the nozzle. The actuator is configured to change a volume of the pressure chamber according to an electrical signal applied thereto. The actuator includes an upper surface and a side surface connecting the upper surface to the substrate. The side surface is inclined with respect to the substrate at an inclination angle $\theta$ that is between 45 and 90 degrees. The liquid ejection head further includes an electrode connected to the pressure chamber through which the electrical signal is supplied. The electrode extends along a first direction parallel to the substrate and includes a first wiring on the side surface and a second wiring on the substrate within a first region of the substrate. The first region has a length A in the first direction from a line along which the upper surface and the side surface are connected when viewed along a second direction perpendicular to the substrate, and the length A is the value $B/\tan\theta'$, where B is a distance between the upper surface and the substrate and $\theta'$ is $(\theta-45)\times2$.

Figure 1:
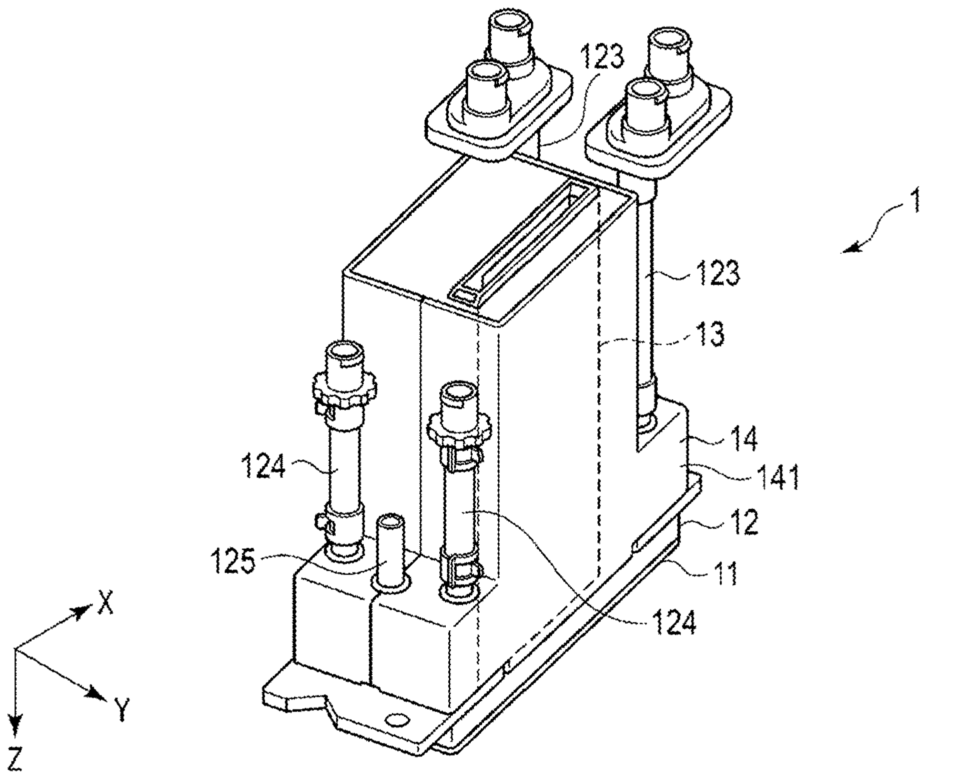
FIG. 1 is a perspective view illustrating a liquid ejection head according to an embodiment.
Figure 2:
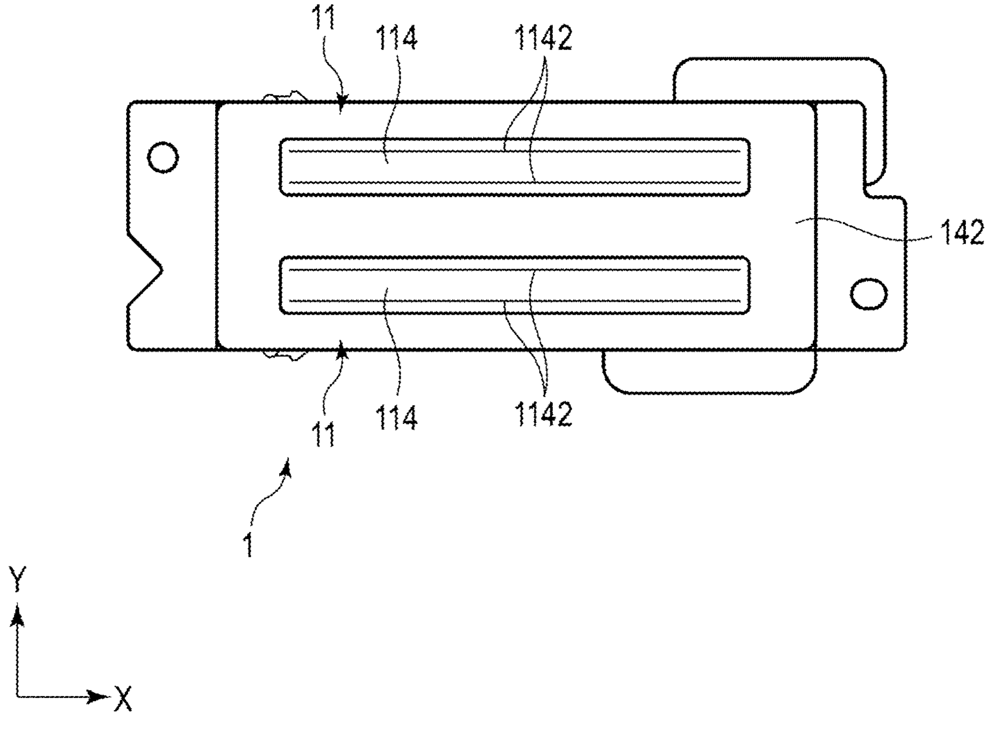
FIGS. 2 and 3 are bottom views illustrating a liquid ejection head.
Figure 3:
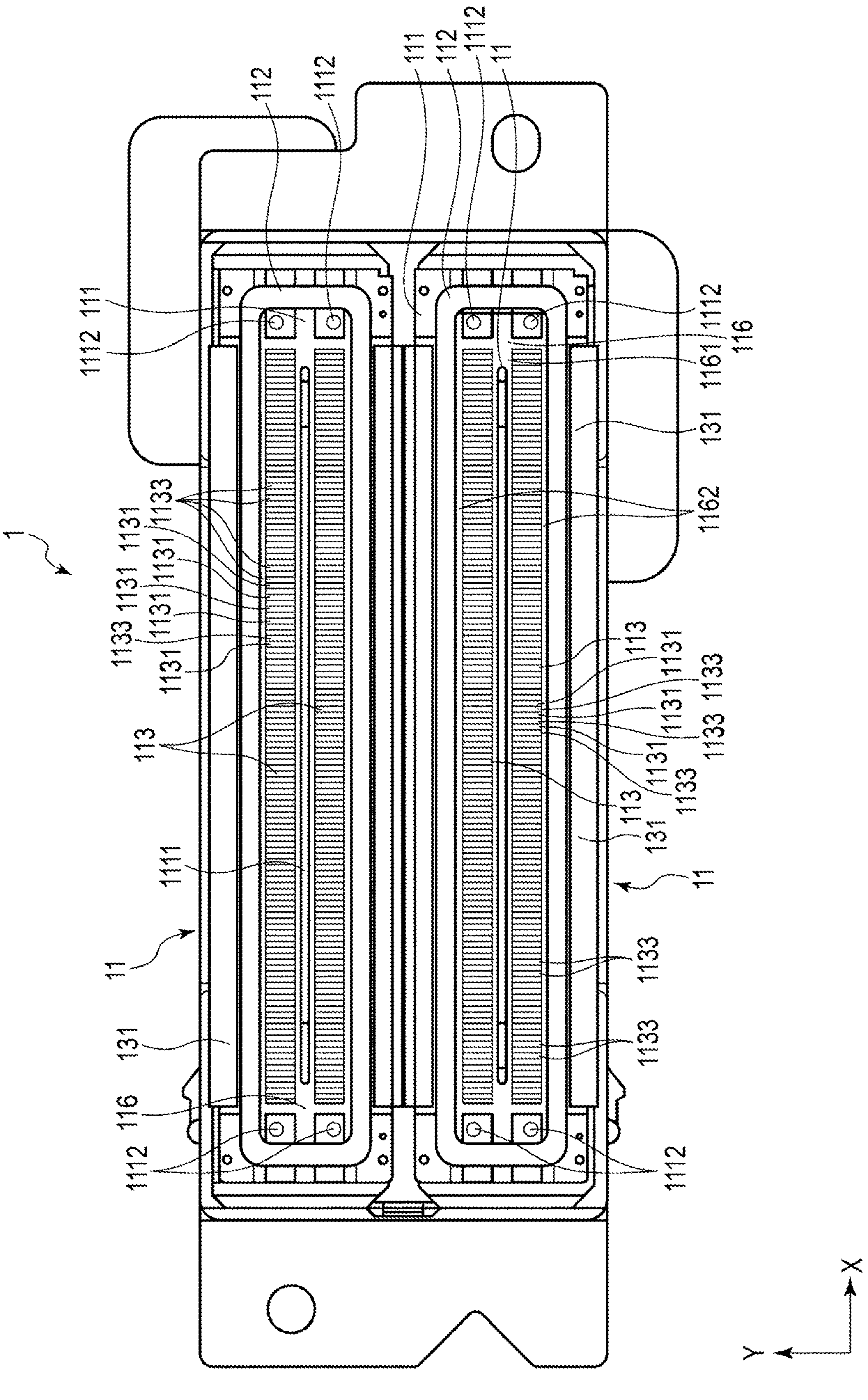
Figure 4:
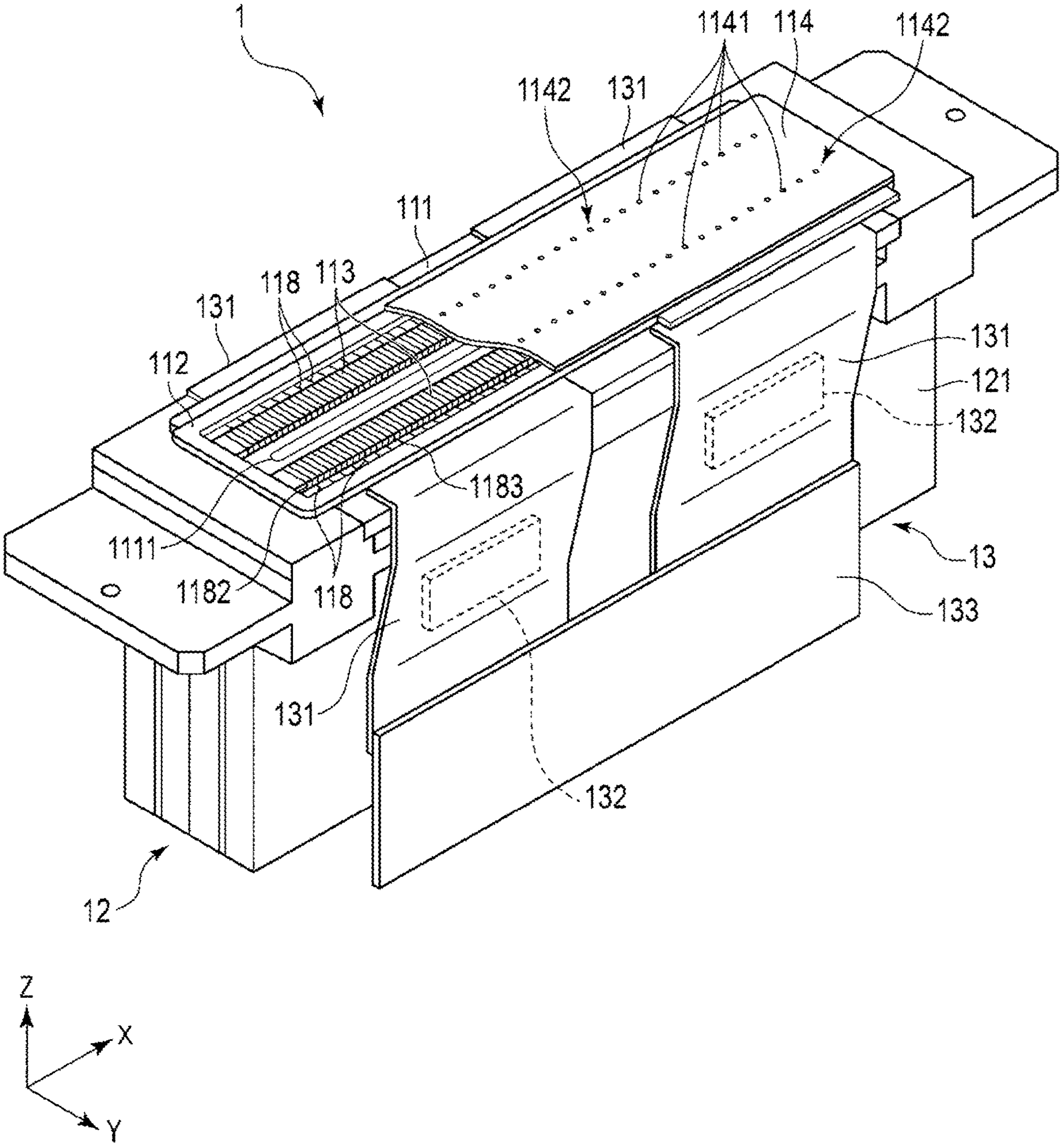
FIG. 4 is a perspective view illustrating a head body of a liquid ejection head.
Figure 5:
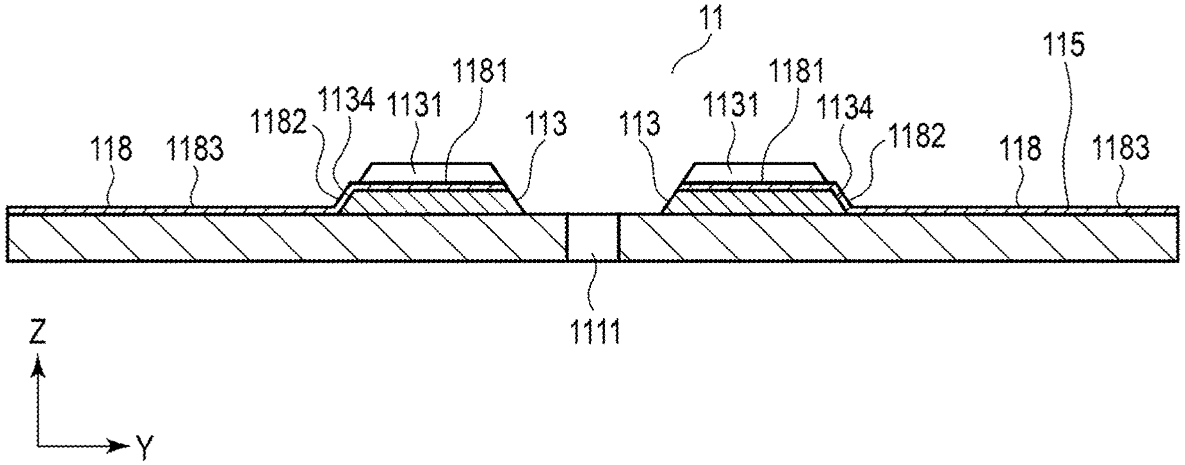
FIGS. 5 and 6 are cross-sectional views illustrating a head body of a liquid ejection head.
Figure 6:
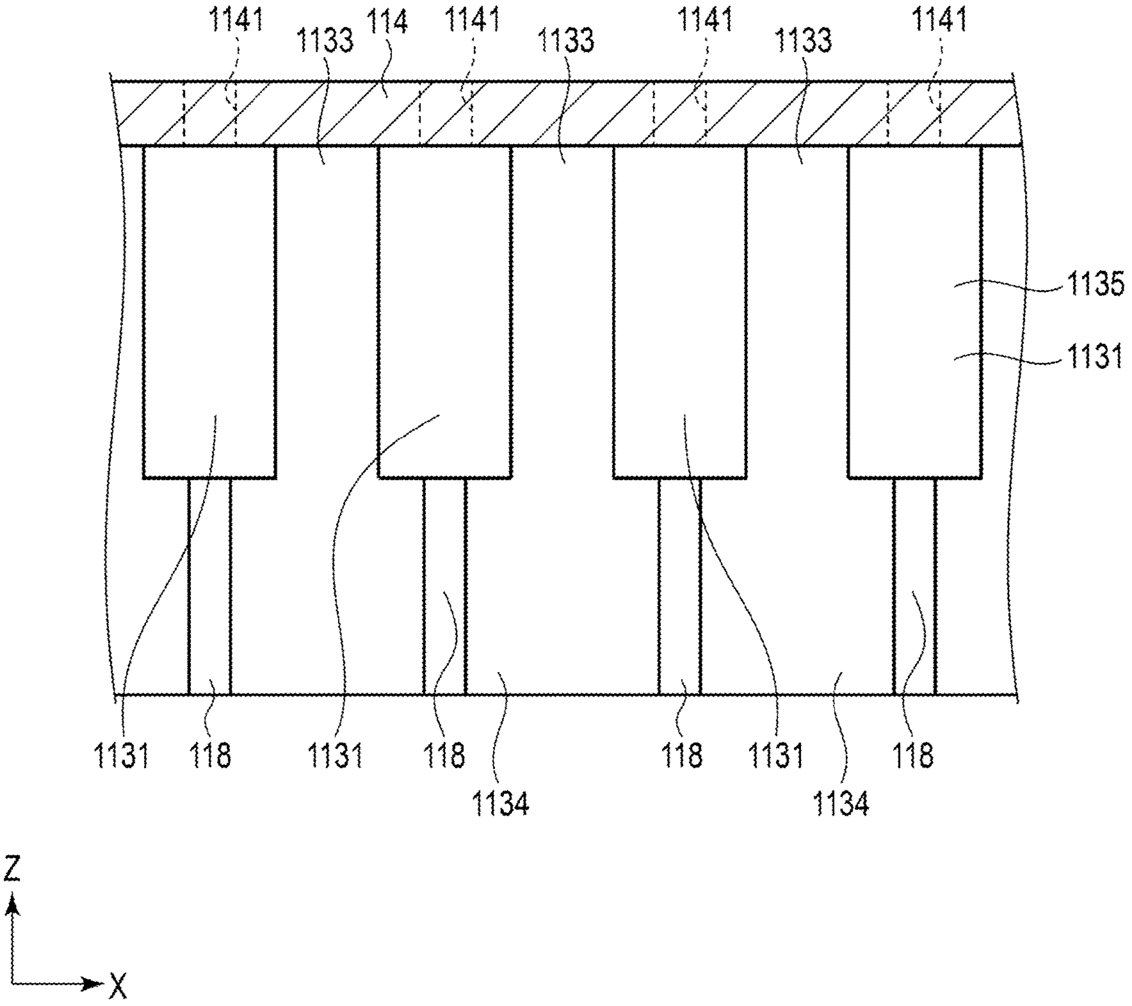
Figure 7:
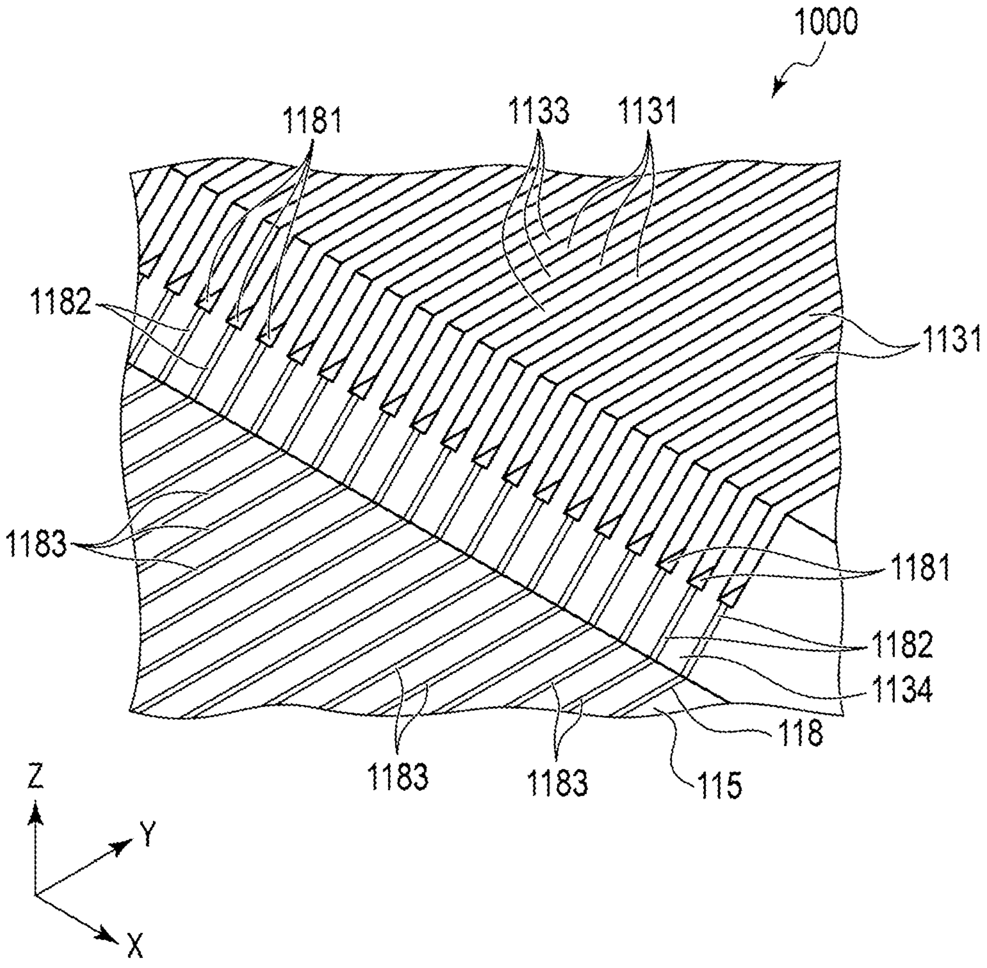
FIG. 7 is a perspective view illustrating wirings of a liquid ejection head.
Figure 8:
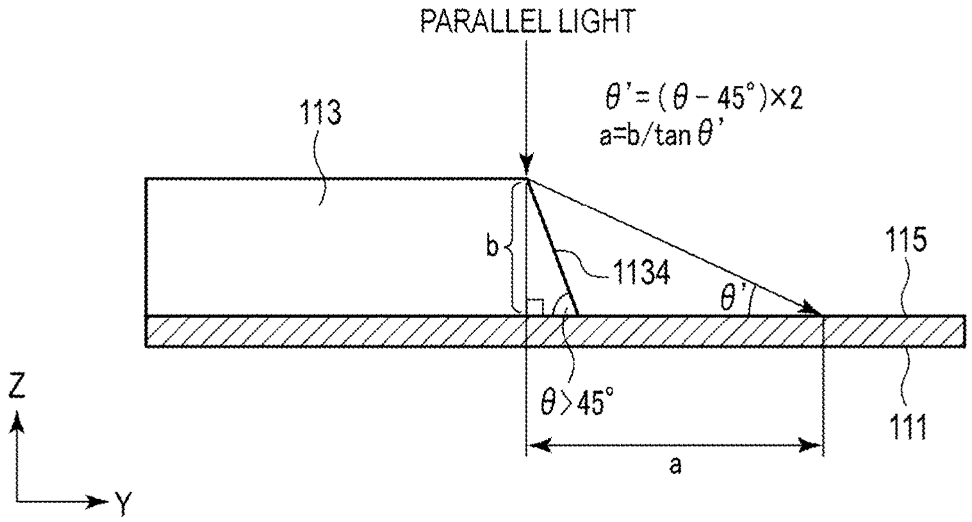
FIG. 8 is a diagram of a wiring of a liquid ejection head.
Figure 9:
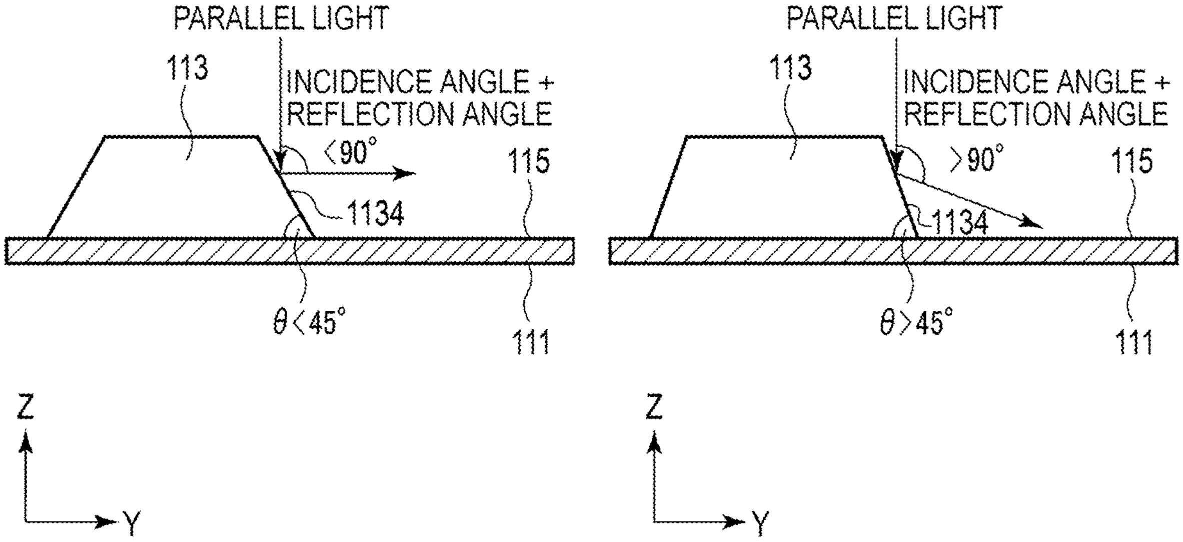
FIG. 9 is a diagram of a wiring of a liquid ejection head.
Figure 10:
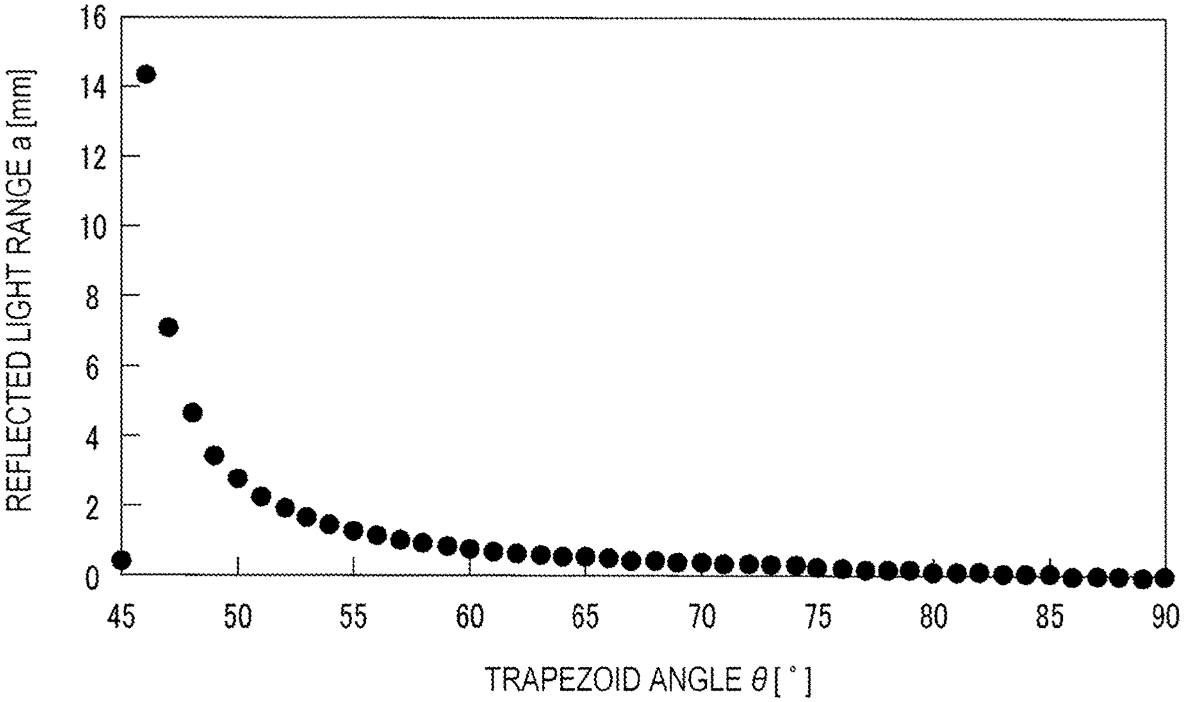
FIG. 10 depicts a relationship between inclination angles and ranges of reflected light.
Figure 11:
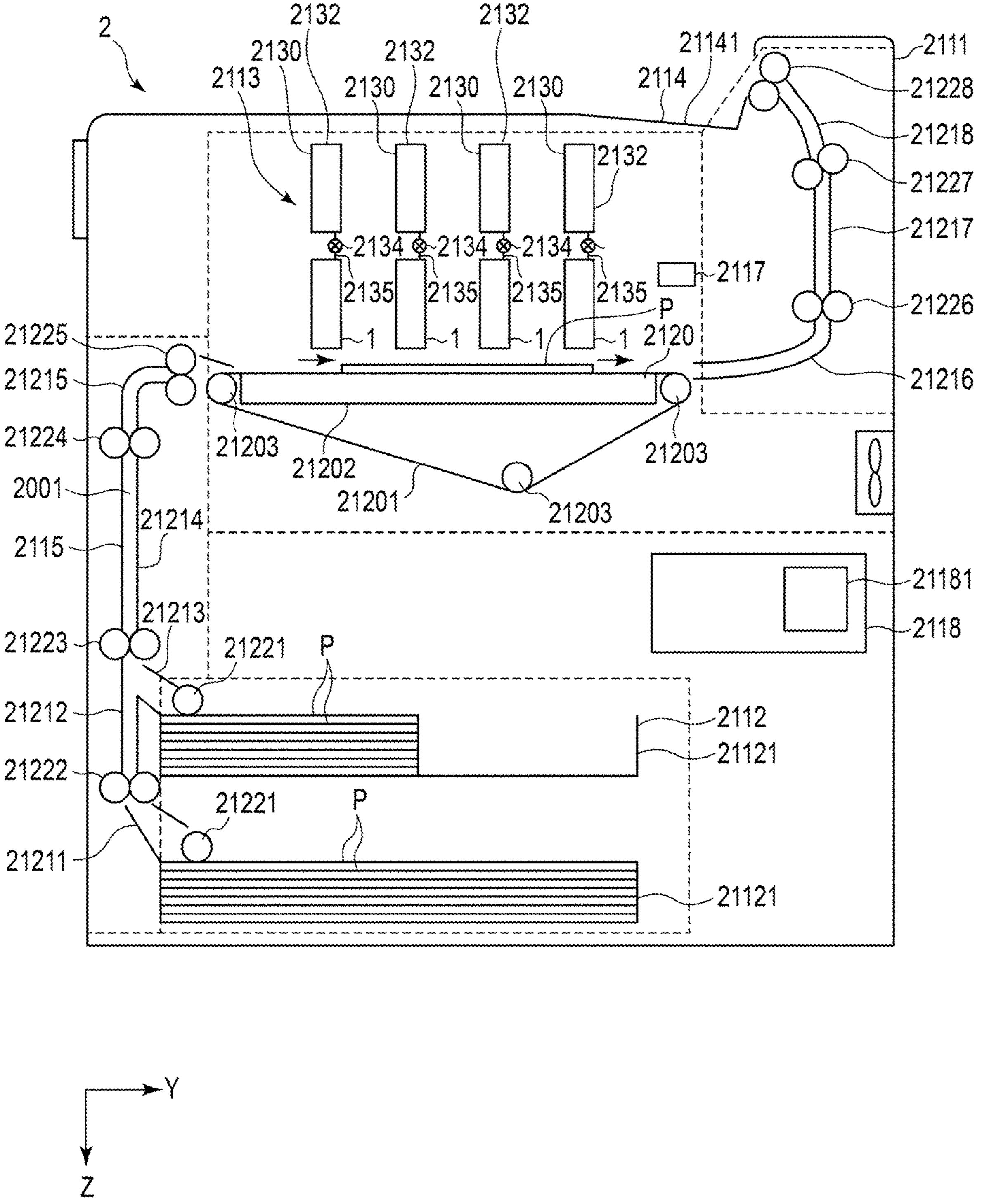
FIG. 11 is a diagram illustrating a liquid ejection apparatus.

Hereinafter, a liquid ejection head 1 and a liquid ejection apparatus 2 incorporating the liquid ejection head 1 according to an embodiment will be described with reference to FIGS. 1 to 11. FIG. 1 is a perspective view illustrating the liquid ejection head 1, and FIG. 2 is a bottom view illustrating the liquid ejection head 1. FIG. 3 is a bottom view illustrating the liquid ejection head 1 in which a nozzle plate 114 is omitted to show other aspects. FIG. 4 is a perspective view illustrating a head body 11 of the liquid ejection head 1 in which a part of the nozzle plate 114 is cut away to show internal aspects of the liquid ejection head 1, and FIG. 5 is a cross-sectional view illustrating the head body 11. FIG. 6 is a cross-sectional view illustrating a substrate 111 and actuator 113 of the head body 11. FIG. 7 is a perspective view illustrating wirings of the head body 11. FIGS. 8 and 9 are diagrams illustrating a range of reflected light if a wiring surface is irradiated with light. FIG. 10 depicts a relationship between inclination angles and the ranges of reflected light. FIG. 11 is an explanatory diagram illustrating the liquid ejection apparatus 2 using the liquid ejection head 1. In those figures, X, Y, and Z indicate the first direction, the second direction, and the three directions orthogonal to each other, respectively. In this disclosure, a parallel direction of nozzles 28 and pressure chambers 31 of the ink jet head 10 is along the X-axis, an extension direction of the pressure chamber 31 is along the Y-axis, and an ejection direction of liquid is along the Z-axis for the sake of explanation. In each figure, parts of the liquid ejection head 1 or the liquid ejection apparatus 2 may be enlarged, reduced, or omitted as appropriate.

The liquid ejection head 1 is a shear-mode, shared wall type ink jet head provided in a liquid ejection apparatus 2 such as the ink jet recording apparatus illustrated in FIG. 11. The liquid ejection head 1 is provided in a head unit 2130, which includes a supply tank 2132 (liquid storage unit).

The liquid ejection head 1 is supplied with ink from the supply tank 2132. The liquid ejection head 1 may be a non-circulating type head that does not circulate ink between the liquid ejection head 1 and the supply tank 2132, or may be a circulating type head that circulates ink between the liquid ejection head 1 and the supply tank 2132. In this example, the liquid ejection head 1 is a non-circulating type head.

As illustrated in FIG. 1, the liquid ejection head 1 includes a head body 11, a manifold unit 12, a circuit board 13, and a cover 14. For example, the liquid ejection head 1 is a side shooter type four-row integrated structure head including two pairs of head bodies 11 each of which has a pair of actuators 113.

The head body 11 ejects the liquid (e.g., ink). As illustrated in FIGS. 3 to 8, the head body 11 includes the substrate 111, a frame body 112, an actuator 113, and a nozzle plate 114. The actuator 113 has a plurality of pressure chambers 1131.

The head body 11 includes a common liquid chamber 116 that communicates with (connects to) the plurality of pressure chambers 1131 of an actuator 113. The primary side of the plurality of pressure chambers 1131 is an upstream side with respect to the direction in which the liquid flows from the supply tank 2132 for ejection. The secondary side of the plurality of pressure chambers 1131 is a downstream side.

The head body 11 includes a plurality of individual electrodes 118 on the substrate 111 and the actuator 113 for driving the plurality of pressure chambers 1131.

In this example, the head body 11 includes two actuators 113, and one first common liquid chamber 1161 and two second common liquid chambers 1162 for each actuator 113. The common liquid chamber 116 for an actuator 113 comprises a first common liquid chamber 1161, which communicates with openings (inlets) on the primary side of the plurality of pressure chambers 1131 of the actuator 113, and two second common liquid chambers 1162 (on opposite sides of the first common liquid chamber 1161) that communicate with openings (outlets) on the secondary side of the plurality of pressure chambers 1131 of the actuator 113.

The substrate 111 is, for example, a ceramic material formed in a rectangular plate shape. The substrate 111 is, for example, a rectangular shape that is long in X-direction.

A second wiring portion 1183 forming a part of the plurality of individual electrodes 118 is formed on a wiring surface 115, which is one surface of the substrate 111. The second wiring portion 1183 is formed of, for example, a nickel thin film. The second wiring portion 1183 has a predetermined pattern shape connected to a first wiring portion formed in the actuator 113.

A pair of actuators 113 are provided to be aligned in the lateral direction (i.e., Y-direction) of the substrate 111. The substrate 111 has a single supply port 1111 and a plurality of discharge ports 1112. The supply port 1111 and the discharge ports 1112 are through-holes penetrating between both main surfaces of the substrate 111.

The supply port 1111 is an inlet for supplying ink to the first common liquid chamber 1161. The supply port 1111 is a through-hole formed in the center of the substrate 111 in the lateral direction. The supply port 1111 extends along the longitudinal direction of the substrate 111. In other words, the supply port 1111 is, for example, a long hole (i.e., a slot or groove shape) that is long in one direction along the longitudinal direction of the actuator 113 and the longitudinal direction of the first common liquid chamber 1161. The supply port 1111 is provided between the pair of actuators 113 and opens at a position facing the first common liquid chamber 1161.

The discharge port 1112 is an outlet for discharging ink from the second common liquid chamber 1162. A plurality of discharge ports 1112, for example, four discharge ports, are provided. Each discharge port 1112 is located between the first common liquid chamber 1161 and one of the second common liquid chambers 1162. A discharge port 112 is adjacent to each end in the longitudinal direction of each of the pair of actuators 113. In some examples, the discharge ports 1112 may be provided in the second common liquid chambers 1162.

The frame body 112 is fixed to one main surface of the substrate 111 with an adhesive or the like. The frame body 112 surrounds the supply port 1111, the plurality of discharge ports 1112, and the actuators 113 that are provided on the substrate 111.

For example, the frame body 112 is formed in a rectangular frame shape. The pair of actuators 113, the supply port 1111, and four discharge ports 1112 are disposed in the opening of the frame body 112.

The pair of actuators 113 are adhered to a mounting surface of the substrate 111. The pair of actuators 113 are aligned in two rows with the supply port 1111 interposed therebetween. Each actuator 113 is formed in a plate shape that is long in one direction. Each actuator 113 is disposed in the opening of the frame body 112 and adhered to the main surface of the substrate 111.

As illustrated in FIGS. 6 and 7, an actuator 113 includes a plurality of pressure chambers 1131 disposed at equal intervals in the longitudinal direction in two rows.

The top surface portion of the actuator 113, which is a surface opposite to the substrate 111, is adhered to the nozzle plate 114. The actuators 113 are disposed to be aligned at equal intervals in the longitudinal direction, and each of the actuators 113 is formed with a plurality of grooves along a direction orthogonal to the longitudinal direction. The plurality of grooves form the plurality of pressure chambers 1131. In other words, the actuator 113 includes a plurality of piezoelectric bodies 1133 (walls) at equal intervals in the longitudinal direction and are drive elements that are the walls between the grooves. The adjacent piezoelectric bodies 1133 form of the sidewalls of a pressure chamber 1131, and a volume of the pressure chamber 1131 can be changed by applying a driving voltage to the piezoelectric body 1133.

For example, a width of the actuator 113 in the lateral direction gradually increases from the top side toward the substrate 111 side. A cross-sectional shape of a cross section along the lateral direction orthogonal to the longitudinal direction of the actuator 113 is formed into a trapezoidal shape. That is, the actuator 113 has an inclined surface 1134 of a side surface of the actuator 113. The inclined surface 1134 that is angled upward from the plane of the wiring surface 115 along the lateral direction. An inclined surface 1134 can be on both sides of the actuator 113 as to face the first common liquid chamber 1161 and the second common liquid chamber 1162 on each side, respectively.

An inclination angle θ (see FIG. 8) between inclined surface 1134 and the plane of the wiring surface 115 can be, for example, greater than 45 degrees but less than 90 degrees. In an embodiment, the inclination angle θ is set to 60 degrees or more.

A pressure chamber 1131 can be deformed so that ink is ejected from the nozzle 1141 for printing by the liquid ejection head 1. Each pressure chamber 1131 has an inlet that opens to the first common liquid chamber 1161 and an outlet that opens to a second common liquid chamber 1162. Ink flows into the pressure chamber 1131 from the inlet and out from the outlet. In some examples, the pressure chamber 1131 may be configured such that ink flows in from openings at both ends of the pressure chamber 1131 rather than having either end serve as an outlet.

The nozzle plate 114 is formed in a plate shape. The nozzle plate 114 is fixed to the frame body 112 on the side opposite from the substrate 111 with an adhesive or the like. The nozzle plate 114 has a plurality of nozzles 1141 formed at positions facing the plurality of pressure chambers 1131. In an embodiment, the nozzle plate 114 includes two nozzle rows 1142 in which a plurality of nozzles 1141 are aligned.

The first common liquid chamber 1161 is formed between the central sides of the pair of actuators 113 except for both ends of the pair of actuators 113, and forms an ink flow path from the supply port 1111 to the openings (inlets) on the primary side of the pressure chambers 1131 of each actuator 113. The first common liquid chamber 1161 extends along the longitudinal direction of the actuator 113.

Each of the second common liquid chambers 1162 is formed between an actuator 113 and the frame body 112. Each of the second common liquid chambers 1162 forms an ink flow path from the openings (outlets) on the secondary side of the plurality of pressure chambers 1131 to the discharge port 1112. The second common liquid chambers 1162 extend along the longitudinal direction of the actuator 113.

The plurality of individual electrodes 118 are electrodes that can be used to individually apply a driving voltage to the plurality of piezoelectric bodies 1133. The individual electrodes 118 may be used to individually deform any particular one of the pressure chambers 1131. Each individual electrode 118 comprises the wiring portions that are formed on the actuator 113 and on the substrate 111.

For example, as illustrated in FIGS. 7 and 8, each of the individual electrodes 118 includes a first individual electrode 1181 formed on the inner surface of the pressure chamber 1131, a first wiring portion 1182 formed on the inclined surface 1134 of the actuator 113, and a second wiring portion 1183 formed on the wiring surface 115 of the substrate 111 in series. Each of the individual electrodes 118 is drawn out from the inner surface of the pressure chamber 1131 to the inclined surface 1134 and the wiring surface 115 of the substrate 111. Each of the individual electrodes 118 extends to the end of the substrate 111 in the lateral direction and is connected to the circuit board 13 of the substrate 111.

Each individual electrode 118 is formed of, for example, a nickel thin film. The individual electrodes 118 are not limited to being a nickel thin film, and may be formed of, for example, a thin film of gold or copper. The thickness of the individual electrode 118 is, for example, 0.5 μm to 5 μm. A conductive material can be formed for the individual electrode 118 by a method such as a vacuum vapor deposition method or an electroless plating method, and the individual electrodes 118 can then be patterned into a predetermined shape by photolithography. In the photolithography process, after applying a photosensitive resist material (photoresist), a wiring pattern exposure is performed by irradiating the photosensitive resist material with ultraviolet light passed through a photomask. Wiring is then formed by a developing step (developing the latent exposed pattern in the photoresist) followed by an etching step (etching the previously deposited conductive material). In the processing for forming the individual electrodes 118, the first individual electrode 1181 may be formed at the same time as the first wiring portion 1182 and the second wiring portion 1183, or these may be formed in separate steps.

In an embodiment, the second wiring portion 1183 is formed along the wiring surface 115 and extends in the same direction as the first wiring portion 1182 extending from the actuator 113, at least within a reflection light range that the reflected light of a photolithography patterning step might reach. Specifically, the first wiring portion 1182 and the second wiring portion 1183 extend in the same straight line toward the second direction (Y-direction), which is the lateral direction of the actuator 113 in a plan view when viewed from the third direction (Z-direction). That is, the individual electrodes 118 extend in a direction that is orthogonal to the first direction (X-direction), which is an arrangement direction of the plurality of nozzles 1141, and is perpendicular to upper and lower sides that are edge portions of the inclined surface 1134, at least within the reflection light range in which the distance from the actuator is “a” (see FIG. 8) or less. Then, the second wiring portion 1183 extends in the second direction (Y-direction), which is the lateral direction of the actuator 113, along the surface of the wiring surface 115.

For example, the reflection light range “a” corresponds to a region in which the parallel light emitted and reflected during exposure reaches the wiring surface 115. The reflection light range “a” can be calculated from the height b (see FIG. 8) from the wiring surface 115 to the upper surface of the actuator 113 and the inclination angle θ formed by the wiring surface 115 and the inclined surface 1134, and is represented by the equation: $a=b/\tan\theta$. FIG. 10 illustrates the relationship between reflection light ranges “a” and inclination angles θ where “b” is 0.5 mm.

Here, when the height of the inclined surface 1134 from the wiring surface 115 is “b” and the inclination angle between the inclined surface 1134 and the wiring surface 115 is θ, the angle θ' is calculated by the equation: $\theta'=(\theta-45)\times 2$, and thus the reflection light range “a” can be calculated by the equation: $a=b/\tan\theta'$. Within this range, light incident on the inclined surface 1134 may reach the region where the second wiring portion 1183 is formed during pattern formation. Therefore, in an embodiment, the first wiring portion 1182 and the second wiring unit 1183 are disposed on the same straight line, when viewed from an exposure direction during wiring formation, within this reflected light range. For example, the exposure direction is along the third direction (Z-direction) orthogonal to the first direction (X-direction), which is the arrangement direction of the plurality of pressure chambers 1131, and the second direction (Y-direction).

The individual electrode 118 may be partially covered with an adhesive that adheres the frame body 112 to the substrate 111 on the lower surface of the frame body 112.

As illustrated in FIGS. 1 and 3, the manifold unit 12 includes a manifold 121, a top plate 122, ink supply pipes 123, ink discharge pipes 124, and a pair of temperature control pipes of a temperature control water supply pipe 125 and a temperature control water discharge pipe. The numbers of the ink supply pipes 123, the ink discharge pipes 124, the temperature control water supply pipes 125, and the temperature control water discharge pipes can be appropriately set.

The manifold 121 is formed in a plate shape or a block shape. The manifold 121 includes a supply flow path, which is continuous with the supply port 1111 of the substrate 111 and forms a liquid supply flow path, a discharge flow path, which is continuous with the discharge port 1112 of the substrate 111 and forms a liquid discharge flow path, and a temperature control flow path which forms a fluid flow path for temperature control.

One main surface of the manifold 121 is fixed to the main surface of the substrate 111. For example, the ink supply pipe 123, the ink discharge pipe 124, the temperature control water supply pipe 125, and the temperature control water discharge pipe are fixed to the manifold 121 via the top plate 122.

The supply flow path is formed in the manifold 121 by holes and grooves. The supply flow path fluidly connects the ink supply pipe 123 and the supply port 1111 of the substrate 111.

The discharge flow path is formed in the manifold 121 by holes and grooves. The discharge flow path fluidly connects the ink discharge pipe 124 and the discharge port 1112 of the substrate 111.

The temperature control flow path is formed in the manifold 121 by holes and grooves. The temperature control flow path fluidly connects the temperature control water supply pipe 125 and the temperature control water discharge pipe.

The temperature control flow path has openings connected to the temperature control water supply pipe 125 at one end and the temperature control water discharge pipe at the other. The temperature control flow path is capable of heat exchange with the substrate 111 fixed to the manifold 121.

The ink supply pipe 123 is connected to the supply flow path 1211. The ink discharge pipe 124 is connected to the discharge flow path. The temperature control water supply pipe 125 and temperature control water discharge pipe are connected to the primary side and the secondary side of the temperature control flow path, respectively.

As illustrated in FIG. 4, the circuit board 13 includes wiring films 131, each of which has one end connected to the substrate 111, driver ICs 132 mounted on the wiring film 131*s*, and a printed wiring board 133 mounted on the other end of each wiring film 131.

The circuit board 13 drives the actuator 113 by applying a drive voltage to a wiring pattern of the actuator 113 by the driver IC 132 to increase or decrease the volume of the pressure chamber 1131 and eject droplets from the nozzle 1141.

The wiring film 131 is connected to the plurality of individual electrodes 118. For example, the wiring film 131 is an anisotropic conductive film (ACF) fixed to a connection portion of the substrate 111 by thermos-compression bonding or the like. A plurality of wiring films 131 to be connected are provided for, for example, one head body 11. In an embodiment, two wiring films 131 are connected to one actuator 113. The wiring film 131 is, for example, a chip-on-film (COF) on which the driver IC 132 is mounted.

The driver IC 132 is connected to the plurality of individual electrodes 118 via the wiring film 131. The driver IC 132 may be connected to the plurality of individual electrodes 118 by other means such as combination of an anisotropic paste (ACP), a non-conductive film (NCF), and a non-conductive paste (NCP) instead of the wiring film 131.

The printed wiring board 133 is a printing wiring assembly (PWA) on which various electronic components and connectors are mounted.

The cover 14 includes, for example, an outer shell 141 that covers the side surfaces of the pair of head bodies 11, the manifold unit 12, and the circuit board 13, and a mask plate 142 that covers a part of the pair of head bodies 11 on the nozzle plate 114 side.

The outer shell 141 leaves exposed to the outside the ink supply pipe 123, the ink discharge pipe 124, the temperature control water supply pipe 125 and the temperature control water discharge pipe, and the end portion of the circuit board 13.

The mask plate 142 covers a portion of the pair of head bodies 11 excluding the plurality of nozzles 1141 and the periphery of the plurality of nozzles 1141 of the nozzle plate 114.

Figure 12:
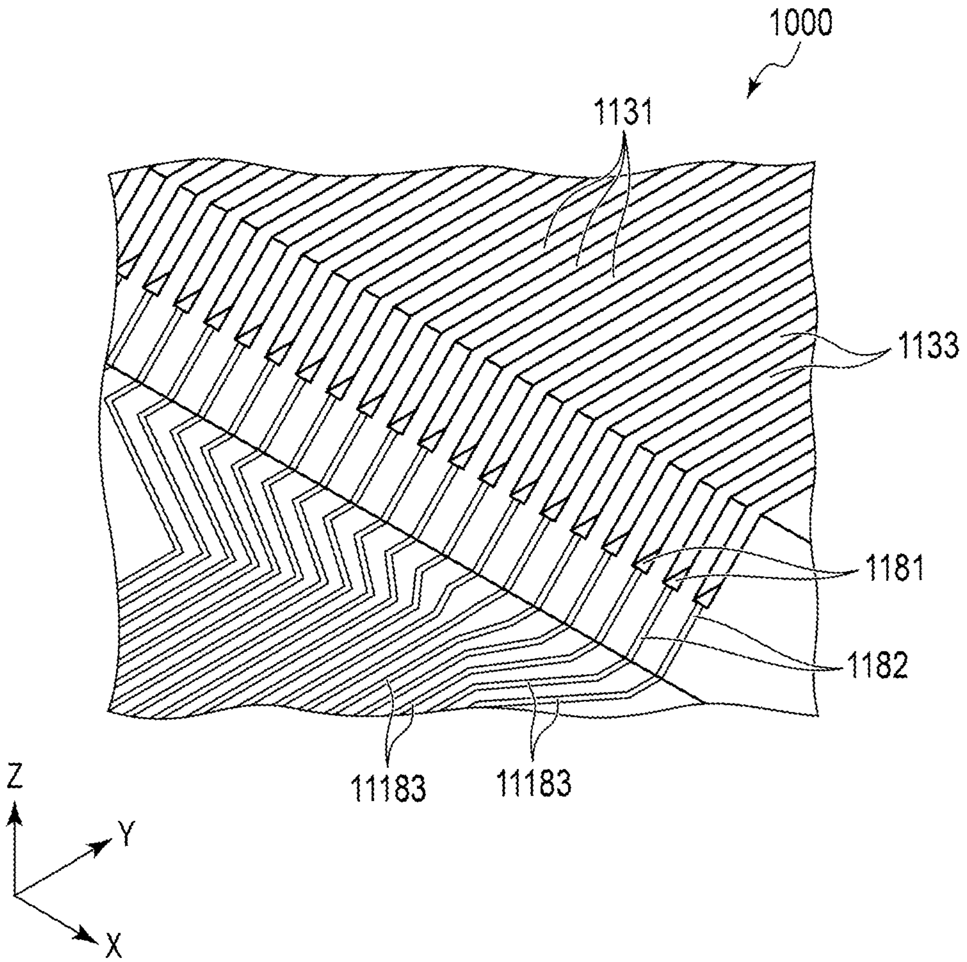
FIG. 12 is a diagram of wirings of a liquid ejection head according to a comparative example.

In the liquid ejection head 1 configured as described above, by disposing the second wiring portion 1183 on the wiring surface 115 on the extension line of the first wiring portion 1182 formed on the inclined surface 1134 of the actuator 113 within the reflection light range that the reflected light can reach, it is possible to avoid the influence of the reflection during pattern formation and prevent the wiring from being open. For example, as illustrated in FIG. 9, if the angle between the wiring surface 115, which is the upper surface of the board 111, and the inclined surface 1134 of the actuator 113 is 45 degrees or less, light reflected by the inclined surface 1134 does not reach the upper surface of the substrate 111 because the sum of the incident angle and the reflection angle is below 90°. However, if the angle between the upper surface of the substrate 111 and the inclined surface 1134 of the actuator 113 is 45 degrees or more, the light reflected by the inclined surface 1134 reaches the wiring surface 115. According to the examples described above, by setting the electrode pattern shape within the range where the reflected light reaches in the same direction, it is possible to avoid exposure of an unintended spot by the reflected light. That is, for example, if the wiring shape of a second wiring portion 11183 is bent at the foot of the inclined surface 1134 as in an ink jet head 1000 illustrated in FIG. 12 as a comparative example, the reflected light on the inclined surface affects the patterning shape during exposure and wiring may be open. However, by disposing the first wiring portion 1182 and the second wiring portion 1183 in a straight line within the reflection light range as illustrated in FIG. 7, it is possible to avoid exposure of an unintended site due to the reflected light, and it is possible to prevent the wiring from being opened.

Since the desired wiring shape can be secured, it is possible to reduce the width of the actuator 113 by increasing the inclination of a side surface portion of the actuator 113 (inclined surface 1134) with respect to the wiring surface 115. Accordingly, the size of the actuator 113 in the second direction (Y-direction), which is the lateral direction, can be reduced, and the effect of reducing the size of the liquid ejection head 1 can be obtained.

Furthermore, by reducing the width of the actuator 113, a larger area can be secured for the supply liquid chamber, and flow path resistance in the supply liquid chamber can be reduced. If the supply port 1111 is disposed between the actuators 113, a larger distance can be secured between the actuator 113 and the supply port 1111 by reducing the width of the actuator 113. As a result, the adhesive by which the actuator 113 and the substrate 111 are adhered to each other can be prevented from flowing into the supply port 1111.

Hereinafter, the ink jet recording apparatus 2 incorporating the liquid ejection head 1 will be described with reference to FIG. 11. The ink jet recording apparatus 2 includes a casing 2111, a paper supply unit 2112, an image forming unit 2113, a paper discharge unit 2114, a conveyance device 2115, a maintenance device 2117, and a control unit 2118. The ink jet recording apparatus 2 includes a temperature control device that adjusts the temperature of ink supplied to the liquid ejection head 1.

The ink jet recording apparatus 2 is an ink jet printer that performs an image forming processing on paper P by ejecting a liquid, such as an ink, onto the paper P as a recording medium while the paper P is conveyed along a predetermined conveyance path 2001 from the paper supply unit 2112 through the image forming unit 2113 to the paper discharge unit 2114.

The paper supply unit 2112 includes a plurality of paper feed cassettes 21121. The image forming unit 2113 includes a support portion 2120 that supports paper, and a plurality of head units 2130 that are disposed so as to face each other above the support portion 2120. The paper discharge unit 2114 includes a paper discharge tray 21141.

The support portion 2120 includes a conveyance belt 21201 provided in a loop shape in a predetermined area for which image formation is performed, a support plate 21202 for supporting the conveyance belt 21201 from the back side, and a plurality of belt rollers 21203 provided on the back side of the conveyance belt 21201.

The head units 2130 include the liquid ejection heads 1 which are a plurality of ink jet heads, a plurality of supply tanks 2132 as liquid tanks mounted on the liquid ejection heads 1, pumps 2134 for supplying ink, and connection flow paths 2135 for connecting the liquid ejection heads 1 and the supply tanks 2132.

In an embodiment, the liquid ejection heads 1 eject ink of four colors of cyan, magenta, yellow, and black, and include the supply tanks 2132 for storing ink of these colors. The supply tank 2132 is connected to the liquid ejection head 1 by the connection flow path 2135.

The pump 2134 is a liquid feed pump such as a piezoelectric pump. The pump 2134 is connected to the control unit 2118 and is driven and controlled by the control unit 2118.

The connection flow path 2135 includes a supply flow path connected to the ink supply pipe 123 of the liquid ejection head 1. The connection flow path 2135 includes a recovery flow path connected to the ink discharge pipe 124 of the liquid ejection head 1. For example, if the liquid ejection head 1 is a non-circulating type liquid ejection head, the recovery flow path is connected to the maintenance device 2117, and if the liquid ejection head 1 is a circulating type liquid ejection head, the recovery flow path is connected to the supply tank 2132.

The conveyance device 2115 conveys paper P along the conveyance path 2001 from the paper feed cassette 21121 past the image forming unit 2113 to the paper discharge tray 21141. The conveyance device 2115 includes a plurality of guide plates (guide plate 21211, 21212, 21213, 21214, 21215, 21216, 21217, and 21218) and a plurality of conveyance roller pairs (conveyance roller pairs 21221, 21222, 21223, 21224, 21225, 21226, 21227, and 21228) disposed along the conveyance path 2001. The conveyance device 2115 guides paper P past the liquid ejection heads 1 for printing.

The maintenance device 2117 suctions and recovers ink from the outer surface of the nozzle plate 114 during a maintenance processing. If the liquid ejection head 1 is a non-circulating type liquid ejection head, the maintenance device 2117 also recovers ink stored in the head body 11 during the maintenance processing. Such a maintenance device 2117 includes a tray, a tank, or the like for storing the recovered ink.

The control unit 2118 includes a processor such as a central processing unit (CPU) 21181, a memory such as a read only memory (ROM) for storing various programs and a random access memory (RAM) for temporarily storing various variable data and image data, and a network interface circuit for receiving data from the outside and outputting data to the outside.

In the liquid ejection head 1 and the liquid ejection apparatus 2 configured in this way, by disposing the second wiring portion 1183 on the wiring surface 115 on the extension line of the first wiring portion 1182 formed on the inclined surface 1134 of the actuator 113, the influence of reflection during pattern formation can be suppressed, within the reflection light range, which is the range that the reflected light can reach.

Exemplary embodiments are not limited to the configuration described above. Hereinafter, some examples of such embodiments will be illustrated. In the embodiments described in the following description, the components described above are designated by the same reference numerals, and detailed description thereof will be omitted.

For example, in the example described above, the exposure direction is along the third direction (Z-direction) orthogonal to the first direction (X-direction) and the second direction (Y-direction). However, the exposure direction may be inclined with respect to the first direction (X-direction), the second direction (Y-direction), and the third direction (Z-direction). Even in such a case, the influence of reflection during exposure can be avoided and a desired wiring shape can be realized because the second wiring unit 1183 is in the same direction as the first wiring portion 1182 when viewed from the exposure direction within the reflection light range.

In the example described above, the liquid ejection head 1 has a pair of head bodies 11. However, the liquid ejection head 1 may have one head body 11. Although the head body 11 described above has a pair of actuators 113, the head body 11 may have one actuator 113.

In the above-described example, the actuator 113 includes a plurality of pressure chambers 1131. However, the actuator 113 may include a plurality of pressure chambers 1131 and air chambers disposed alternately. In such a case, the air chambers may have a single or a plurality of common electrodes for simultaneously driving the plurality of pressure chambers 1131, and the single or the plurality of common electrodes may be drawn out to the side opposite to a drawing-out direction of the individual electrodes. If the air chamber adjacent to the pressure chamber 1131 is provided, each nozzle 1141 in the nozzle plate 114 is disposed in a portion facing a pressure chamber 1131, and the nozzle 1141 is not disposed in a portion facing an air chamber. That is, ink is not ejected from the air chamber. The air chamber is closed, for example, with a wall formed of a photosensitive resin at both ends of the groove of the actuator 113. The air chamber is formed by closing the groove of the actuator 113 with the substrate 111, the nozzle plate 114, and the walls at both ends.

In the example described above, although the liquid ejection head 1 is a non-circulating type head, the liquid discharge head 1 may be a circulating type head, and may have a configuration in which the actuator 113 includes a second pressure chamber, which is for purging and of which an opening on the primary side is continuous in the second common liquid chamber 1162, and includes a third common liquid chamber on the secondary side of the second pressure chamber.

According to at least one example described above, the influence of reflection can be avoided, and wiring can be more easily formed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate including a nozzle from which a liquid can be ejected;

a substrate facing the nozzle plate;

an actuator disposed on the substrate, the actuator including a pressure chamber connected to the nozzle and configured to change a volume of the pressure chamber according to an electrical signal applied to the actuator, wherein the actuator includes an upper surface and a side surface connecting the upper surface to the substrate, the side surface being inclined with respect to the substrate at an inclination angle θ between 45 and 90 degrees; and an electrode connected to the pressure chamber through which the electrical signal is supplied, wherein the electrode extends along a first direction parallel to the substrate and includes a first wiring on the side surface and a second wiring on the substrate within a first region of the substrate, wherein a length of the second wiring in the first region is greater than an entire length of the first wiring, and the first and second wirings extend continuously along the same straight line when viewed from a second direction perpendicular to the substrate, and the first region has a length A in the first direction from a line along which the upper surface and the side surface are connected, when viewed along the second direction, and the length A is the value B divided by tan θ', where B is a distance between the upper surface and the substrate and θ' is (θ−45 degrees)×2.

2. The liquid ejection head according to claim 1, wherein the nozzle plate further includes a plurality of nozzles, the actuator further includes a plurality of pressure chambers each connected to a corresponding one of the nozzles, and the liquid ejection head further comprises a plurality of electrodes arranged along a third direction crossing the first and second directions, each of the plurality of electrodes extending along the first direction and connected to a corresponding one of the pressure chambers, each electrode having a first wiring on the side surface and a second wiring on the substrate within the first region.

3. The liquid ejection head according to claim 2, wherein the pressure chambers are arranged along the third direction.

4. The liquid ejection head according to claim 1, wherein the pressure chamber includes a first electrode portion connected to the first wiring.

5. The liquid ejection head according to claim 1, wherein the inclination angle θ is between 60 and 90 degrees.

6. The liquid ejection head according to claim 1, wherein the substrate includes a liquid supply port adjacent to the actuator in the first direction, and the liquid is supplied to the pressure chamber from the liquid supply port.

7. The liquid ejection head according to claim 6, further comprising:

another actuator on the substrate and adjacent to the liquid supply port in the first direction.

8. The liquid ejection head according to claim 7, further comprising:

a first common liquid chamber between the actuator and the other actuator, the first common liquid chamber communicating with the liquid supply port and the pressure chamber.

9. The liquid ejection head according to claim 8, further comprising:

a second common liquid chamber that communicates with the pressure chamber and faces the side surface of the actuator.

10. The liquid ejection head according to claim 7, wherein the other actuator includes an upper surface and a side surface connecting the upper surface to the substrate, the side surface being inclined with respect to the substrate at the inclination angle θ.

11. An image forming apparatus, comprising:

a conveyer by which a medium is conveyed; and an image forming unit configured to form an image on the medium and including an ink ejection head that includes:

a nozzle plate including a nozzle from which an ink can be ejected, a substrate facing the nozzle plate, an actuator disposed on the substrate, the actuator including a pressure chamber connected to the nozzle and configured to change a volume of the pressure chamber according to an electrical signal applied to the actuator, wherein the actuator includes an upper surface and a side surface connecting the upper surface to the substrate, the side surface being inclined with respect to the substrate at an inclination angle θ between 45 and 90 degrees, and an electrode connected to the pressure chamber through which the electrical signal is supplied, wherein the electrode extends along a first direction parallel to the substrate and includes a first wiring on the side surface and a second wiring on the substrate and within a first region of the substrate, wherein a length of the second wiring in the first region is greater than an entire length of the first wiring, and the first and second wirings extend continuously along the same straight line when viewed from a second direction perpendicular to the substrate, and the first region has a length A in the first direction from a line along which the upper surface and the side surface are connected, when viewed along the second direction, and the length A is the value B divided by tan θ', where B is a distance between the upper surface and the substrate and θ' is (θ−45 degrees)×2.

12. The image forming apparatus according to claim 11, wherein the nozzle plate further includes a plurality of nozzles, the actuator further includes a plurality of pressure chambers each connected to a corresponding one of the nozzles, and the ink ejection head further comprises a plurality of electrodes arranged along a third direction crossing the first and second directions, each of the plurality of electrodes extending along the first direction and connected to a corresponding one of the pressure chambers, each electrode having a first wiring on the side surface and a second wiring on the substrate within the first region.

13. The image forming apparatus according to claim 12, wherein the pressure chambers are arranged along the third direction.

14. The image forming apparatus according to claim 11, wherein the pressure chamber includes a first electrode portion connected to the first wiring.

15. The image forming apparatus according to claim 11, wherein the inclination angle θ is between 60 and 90 degrees.

16. The image forming apparatus according to claim 11, wherein the substrate includes a liquid supply port adjacent to the actuator in the first direction, and the ink is supplied to the pressure chamber from the liquid supply port.

17. The image forming apparatus according to claim 16, wherein the ink ejection head further includes another actuator on the substrate and adjacent to the liquid supply port in the first direction.

18. The image forming apparatus according to claim 17, wherein the ink ejection head further includes a first common liquid chamber between the actuator and the other actuator, the first common liquid chamber communicating with the liquid supply port and the pressure chamber.

19. The image forming apparatus according to claim 18, wherein the ink ejection head further includes a second common liquid chamber that communicates with the pressure chamber and faces the side surface of the actuator.

20. The image forming apparatus according to claim 17, wherein the other actuator includes an upper surface and a side surface connecting the upper surface to the substrate, the side surface being inclined with respect to the substrate at the inclination angle θ.

* * * * *